Nov. 14, 1972   W. L. BERGER   3,702,660
APPARATUS FOR HANDLING A CONTAINER OF PARTS
Filed Sept. 3, 1971   2 Sheets-Sheet 2

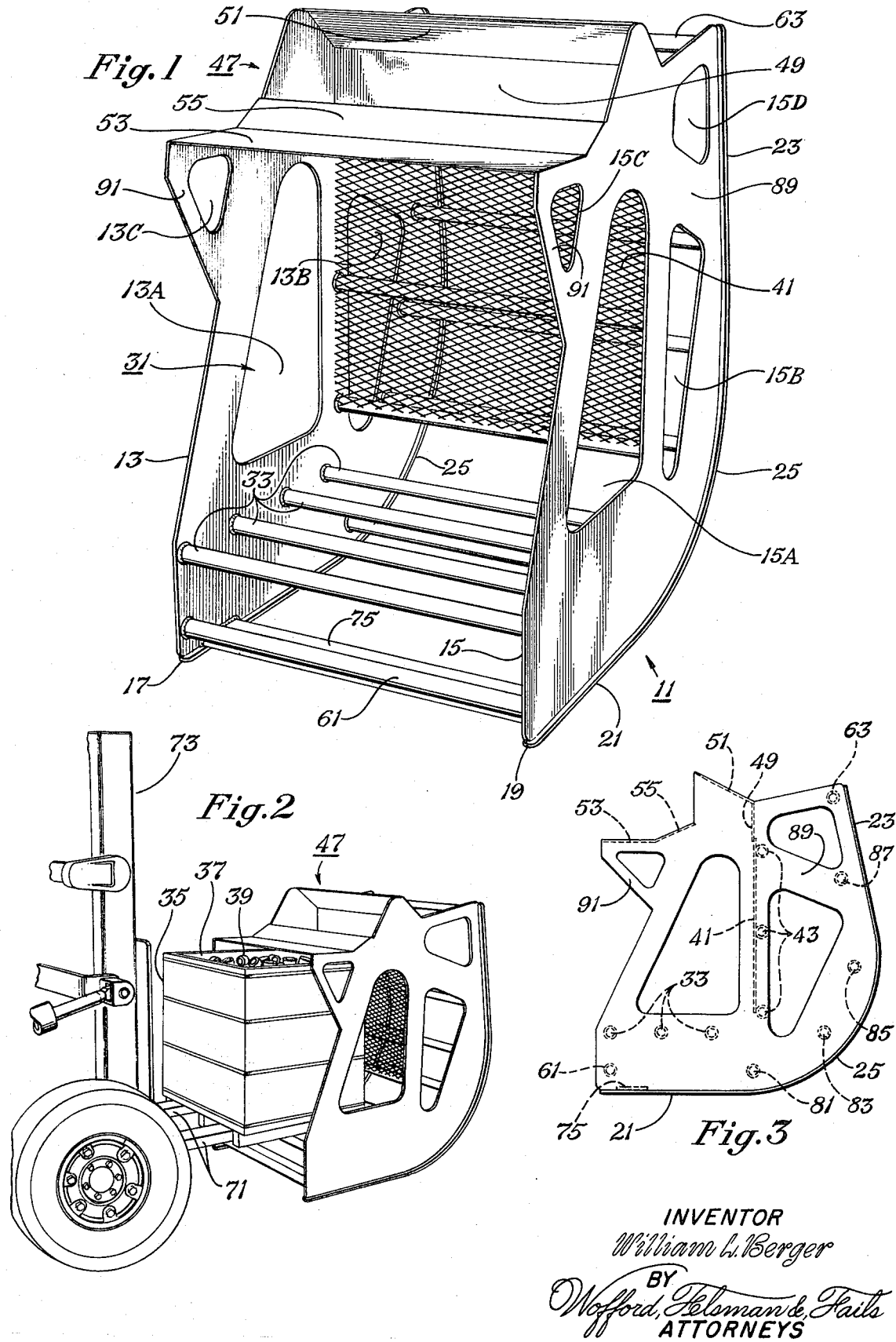

INVENTOR
William L. Berger
BY
Wofford, Felsman & Fails
ATTORNEYS

United States Patent Office 3,702,660
Patented Nov. 14, 1972

3,702,660
APPARATUS FOR HANDLING A CONTAINER
OF PARTS
William L. Berger, 2 Sweetbrush, Texarkana, Tex. 75501
Filed Sept. 3, 1971, Ser. No. 177,739
Int. Cl. B65g 7/00
U.S. Cl. 214—1 QE                              7 Claims

ABSTRACT OF THE DISCLOSURE

The specification discloses an apparatus for handling a container of parts and comprises two sides having supporting edges adapted to rock or turn on the floor or other working surface from one stable position to another, one position being a loading position and the other position being a working position. The supporting edges each have two supporting surfaces in planes slightly less than 90° with respect to each other which define the loading and working positions respectively. These surfaces are joined by a curved surface about which the apparatus can turn or rock from one stable position to the other. A receiving zone or section is provided for movement with the supporting sides for receiving a container adapted to hold parts when in an upright position, and to allow parts to move through an opening in the container when the container is rotated to the working position. In the working position the container is supported in an inclined position with its open end lower than its bottom end, whereby parts from the container may move through the opening by the force of gravity. A receiving bin is carried by the apparatus and located to receive parts from the container which flow through its opening when the apparatus is rotated to its working position.

BACKGROUND OF THE INVENTION

This invention relates to an apparatus for handling a container of parts or items to make more efficient material handling operations.

Small and medium sized parts, either metallic or nonmetallic, such as bolts, nuts, castings, stampings, etc., used for industrial applications generally are delivered or shipped in large, bulk containers. In an assembly plant or other facility, they are stored in the container until needed at which time they must be removed from the container to perform the desired operation. Heretofore, a workman or operator would go to the container and take a handful of parts and then place the parts on his work table or into an intermediate parts container or near his immediate work area where he could then take the individual parts as needed; for example, to feed to a machine, assemble, or perform some labor adding type of work upon the parts. This procedure is inefficient since it involves an additional handling operation or step.

SUMMARY OF THE INVENTION

In accordance with the present invention there is provided an apparatus for handling a container of parts which eliminates the step of grouping the parts on the work table or into an intermediate container which previously has been performed in manufacturing operations. The apparatus comprises support means adapted to turn or rock on the floor from one stable position to another, one position being a loading position and the other position being a working position. Receiving means formed by structure is coupled to the support means for movement therewith for receiving a container adapted to hold parts when in an upright position and to allow parts to move through an opening in the container when in a rotated position. In addition a receiving bin carried by the apparatus is located to receive parts from the container when the support means is in the working position.

In a further aspect, the structure forming the receiving means comprises a container bottom support located in a first plane for supporting the bottom of the container when the apparatus is in its loading position, whereby the container, including its opening is in an upright position. In addition the structure comprises a container side support located in a second plane for supporting a side wall of the container when the apparatus is in its working position whereby the sidewall and hence the container is in an inclined position with its open end lower than its bottom end.

In the embodiment disclosed, the support means comprises two spaced side supports, each having edges with two supporting surfaces in planes slightly less than 90° with respect to each other and joined by a curved surface about which the apparatus can turn or rock from one stable position to the other. The two supporting surfaces of each edge defines the two stable positions of the apparatus.

The first and second planes of the container bottom support and of the container side support are substantially transverse with respect to each other and located within the angle formed by the two supporting surfaces of the support edges.

The bin comprises a first wall extending in the direction of the plane of the container side support and a second wall extending from the first wall at an angle greater than 90°. A restraining surface is located to partially close the top of the container and to restrain the container from significant movement relative to the apparatus during rotation thereof and in addition a surface is provided extending from the restraining surface to control movement of parts from the container into the bin.

In the use of the apparatus, a container of parts is loaded into the receiving section of the apparatus when it is in its loading position and then the apparatus is rocked or rotated to its working position whereby the parts move by gravity through the opening of the container into the bin whereby the operator or workman may reach over and take a part from the bin as needed thereby eliminating the necessity of walking over to the container to obtain individual or a handful of parts as indicated previously.

BRIEF DESCRIPTION OF THE DRAWING

FIG. 1 is a perspective view of the container handling apparatus in its upright or loading position;

FIG. 2 illustrates a container being loaded into the receiving section of the container handling apparatus;

FIG. 3 is a side view of the container handling apparatus illustrating the relative positions of supporting rods;

DESCRIPTION OF THE PREFERRED EMBODIMENT

Figure 4:
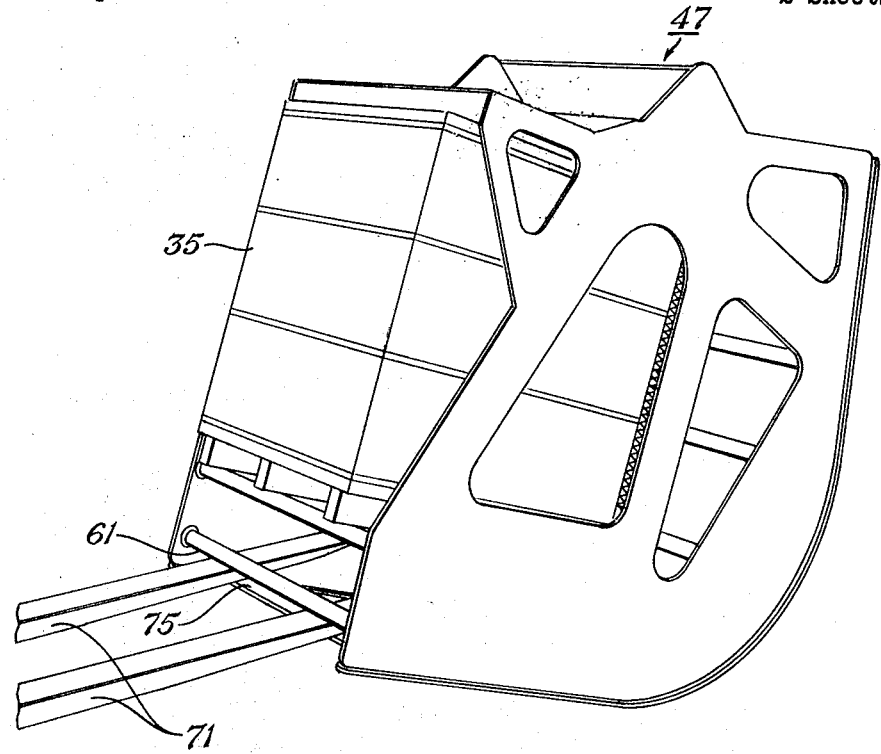
FIG. 4 illustrates the container handling apparatus as it is initially being moved to its working position.

Referring to FIG. 1, the container handling apparatus is identified by numeral 11. It comprises two supporting sides 13 and 15 each having edges or rails 17 and 19, respectively, for supporting the apparatus on the floor of a plant or facility in which it is to be used. As illustrated in FIG. 3, each side and hence, each rail or supporting edge includes flat surfaces 21 and 23 which define or determine two stable positions of the apparatus. The planes of the surfaces 21 and 23 are slightly less than 90° with respect to each other and in one embodiment define an angle of about 80°. Each edge also has a curved surface 25 about which the apparatus 11 can turn or rock from one stable position to the other. In FIGS. 1–3, the apparatus is shown resting on its surfaces 21 in its upright or loading position while in FIG. 5 the apparatus is shown resting on its surface 23 in its working position.

Figure 5:
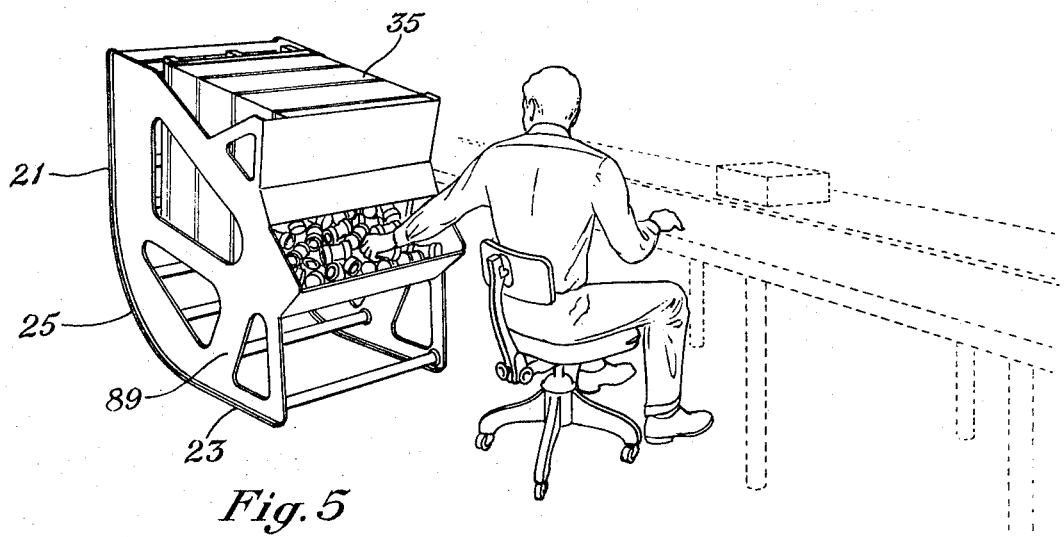
FIG. 5 illustrates the container handling apparatus rotated or rocked to its working position to facilitate the removal of parts as needed by an operator or workman.

Also provided is a container receiving section or zone 31 into which a container of parts may be loaded or inserted. The reeciving section comprises a plurality of support bars 33 coupled to sides 13 and 15 and located in a plane for supporting the bottom of the container in its upright position when the apparatus is in its loading position. A container being loaded into the receiving section is illustrated at 35 in FIG. 2. It comprises four side walls and a bottom with an open top illustrated at 37. It is shown filled with a plurality of parts illustrated at 39 in FIG. 2. The receiving section 31 also comprises a support comprising a screen grid 41 and a plurality of supporting rods 43 extending between the two side walls 13 and 15. The purpose of the support comprising grid 41 and rods 43 is to support the side wall of the container 35 when the apparatus 11 is rocked or rotated to its working position as illustrated in FIG. 5. As can be seen in FIG. 3, the plane of the container bottom support comprising rods 33 is transverse or perpendicular to the plane of the side wall support comprising the grid 41 and rods 43.

Integral with the apparatus is a bin 47 for receiving the parts 39 from the opening 37 of the container 35 as the apparatus is rocked or rotated to its working position. The bin 47 comprises a wall 49 extending from the grid 41 and in substantially the same plane. It also comprises a wall 51 extending from wall 49 at an angle greater than 90°.

Also provided is a surface or wall 53 employed to partially close the top of the container during use and to restrain the container from significant movement relative to the apparatus as it is being rotated. A second surface or wall 55 extending from wall 53 is provided to control the flow of parts from the container into the bin.

The apparatus is constructed whereby it has positive stability when resting either in its loading position on surface 21 or in its working position on surfaces 23. In this respect the apparatus is constructed whereby in either position whether empty or loaded with a container of parts, the apparatus will remain in either of the two positions unless an upward force is applied to move or rock the apparatus to its other position. It rotates or turns from one position to another on curved surfaces 25 on edges or rails 17 and 19, as indicated previously.

Bar 61 provides a lifting surface for rotating the apparatus from the loading position to the working position while bar 63 provides a lifting surface for rotating the apparatus from the working position to the loading position. In the loading position as illustrated in FIG. 3, an upward force applied to the bottom of bar 61 will cause the apparatus to rotate to its other position. The upward force must be applied until the apparatus rotates to a certain point or position.. Beyond that point, it will rock or rotate to the working position due to the force of gravity. This point or position depends upon the type of parts carried by the container as well as the flow of the parts. As the apparatus rotates to its working position, the parts being to flow toward and out of the opening 37 thereby changing the axis of rotation. As the apparatus rotates towards its working position the parts will flow out of the opening 37 into the bin 47. As indicated previously, the wall or surface 55 controls the flow of parts from the container into the bin. The parts flow into the bin since the container, in the working position, is inclined whereby its open end is lower than its bottom end.

The bin is located or carried by the apparatus whereby in the working position of the apparatus a workman may easily reach around to obtain a desired part as illustrated in FIG. 5. As the parts are removed from the bin, other parts from the container will flow or move into the bin. The change in weight distribution will not cause the apparatus to rock or rotate back to its loading position. This can be done only by applying a positive upward force to the bar 63 to rock or rotate the apparatus from its working position to its loading position.

The openings 13A, 13B, 13C and 13D (not shown) in side wall 13 and the openings 15A, 15B, 15C and 15D in side wall 15 are provided to lighten the weight of the apparatus and to provide a counter balancing effect to allow the apparatus to remain in either of its two stable positions unless a positive upward force is applied to cause it to rock from one position to the other either by hand or by a machine when empty or when full.

Referring to FIGS. 2 and 4, one method of loading the apparatus with a container and rotating the apparatus to its working position will be described. The forks 71 of a forklift, illustrated at 73, are inserted under the container to lift the container and insert it in the receiving section 31 whereby its bottom rests upon the bars 33. In inserting the forks under the container, preferably they are extended beyond the leading edge of the container. As illustrated in FIG. 3, between the bars 33 and 43 there is a clearance through which the extended forks may be inserted so that the leading edge of the container can be brought up against the mesh 41 thereby preventing the container from shifting as the apparatus is rotated to its working position. After the container has been loaded into the receiving section of the apparatus, the forks may be inserted under bar 61 as illustrated in FIG. 4 and lifted upward to cause the apparatus to rotate to its working position. A safety bar 75 is provided to limit the rate of rotation as the apparatus begins to move from its loading to its working position. In this respect the load may begin to shift rapidly whereby it may cause the apparatus to rotate faster than the forks 71 are being lifted. If this occurs, the top surface of the restraining bar 75 will abut against the bottom surface of the fork 71 to restrain rotation of the apparatus. The forks 71 are inserted between the bars 61 and 75 only sufficient enough to provide the upward positive force needed to cause rotation and to allow them to be retracted at a certain level whereby the device may rotate to its working position by the force of gravity.

In one embodiment, the apparatus has a height of about 4½ feet when located in its loading position and a height of about 4 feet when located in its working position. In the working position, the top of the bin 47 is about two feet off of the floor thereby presenting the parts in a readily accessible position or location whereby a workman seated at a chair may easily reach over and choose the part he desires. The width of the apparatus is of the order of 2½ feet. The side walls 13 and 15 are formed of ¼ inch steel, while the intermediate supporting bars are of steel also. This apparatus has a weight of about 380 pounds. As mentioned before, it is constructed whereby either when empty or loaded it may be rotated to either of its positions either by hand or by mechanical means such as a forklift.

It is to be understood that the apparatus of the present invention may be constructed to be smaller or larger than the embodiment mentioned above.

Referring again to FIGS. 1 and 3, the bars 81, 83, 85 and 87 provide lateral support for the apparatus and along with bar 63 and the front bar of the bars 33 provide carrying surfaces for transporting the apparatus to its intended place of use. The webs 89 are employed to transmit the container load force to the supporting edges or rails 17 and 19, while the webs 91 provide diagonal support to transmit to the main structure of the apparatus the load occurring when the apparatus is rotated with a container located in its receiving section.

As can now be understood the present invention allows the parts when received in bulk containers, whether boxes, cartons, barrels, drums, etc., to be delivered by means of gravity to an easily accessible place or bin for an operator to selectively choose the parts one at a time as needed and to immediately proceed with his next work operation.

Moreover, if the job on which the operator is working is to cease for a period of time and a quantity of the parts still remain, the apparatus and hence the container may be uprighted by rotating or turning the apparaus back to its loading position. The parts in the bin will automatically flow back into the container and the container with the remaining parts may be removed from the apparatus, for example with a forklift, and stored for future use.

What is claimed is:

1. An apparatus for handling a container of parts comprising:
   support means adapted to turn on a surface from one stable position to another;
   one position being a loading position and the other position being a working position;
   receiving means formed by structure coupled to said support means for movement therewith for receiving a container adapted to hold parts when in an upright position and to allow parts to move through an opening in the container when in a rotated position;
   said structure being adapted to support a container in an upright position when said support means is located at said loading position and to support a container in said rotated position when said support means is located at said working position; and
   a receiving bin carried by said support means and located to receive parts from the container when said support means is in said working position.

2. The apparatus of claim 1 wherein said structure comprises:
   a container bottom support located in a first plane for supporting the bottom of a container when the apparatus is in its loading position whereby the container including its opening is in an upright position; and
   a container side support located in a second plane for supporting a side wall of the container when the apparatus is in its working position whereby the side wall and hence the container is in an inclined position with its open end lower than its bottom end.

3. The apparatus of claim 2 wherein said support means comprises:
   means having two supporting surfaces in planes less than 90° with respect to each other and joined by a curved surface about which said apparatus can turn from one stable position to the other;
   said two supporting surfaces defining said two stable positions of said apparatus.

4. The apparatus of claim 3 wherein:
   said first and second planes of said container bottom support and said cotnainer side support are substantially transverse with respect to each other and located within the angle formed by said two supporting surfaces;
   the plane of one of said supporting surfaces being substantially parallel to the plane of said container bottom support and the plane of the other supporting surface being inclined with respect to the plane of said container side support.

5. The apparatus of claim 4 wherein said support means comprises two spaced side supports each having edges with two supporting surfaces in planes less than 90° with respect to each other and joined by a curved surface about which said apparatus can turn from one stable position to the other and defined by said two supporting surfaces of each edge, respectively.

6. The apparatus of claim 4 wherein the bin comprises a first wall extending from said container side support and a second wall extending from said first wall at an angle greater than 90°.

7. The apparatus of claim 6 comprising:
   a restraining surface located to partially close the top of the container and to restrain the container from significant movement relative to said apparatus during rotation thereof; and
   a surface extending from said restraining surface to conrtol movement of parts from the container into the bin.

References Cited

UNITED STATES PATENTS

| 1,018,862 | 2/1912 | Ayres | 214—46.32 |
| 1,226,483 | 5/1917 | Duvall | 214—46.32 |
| 2,167,682 | 8/1939 | Samiran | 222—463 X |

GERALD M. FORLENZA, Primary Examiner

F. E. WERNER, Assistant Examiner

U.S. Cl. X.R.

214—313; 222—463; 248—143